United States Patent [19]
Harmon et al.

[11] Patent Number: 5,727,039
[45] Date of Patent: Mar. 10, 1998

[54] SPACER CAPTURE MECHANSIM FOR NON-ROUND WATER RODS

[75] Inventors: John L. Harmon; Richard G. Patterson; Robert B. Elkins; Russell P. Higgins, all of Wilmington, N.C.; Edward A. Croteau, Mukwonago, Wis.; Harold B. King, Wrightsville Beach, N.C.; Christian D. Frederickson, Wilmington, N.C.; Gerald M. Latter, Wilmington, N.C.; Anthony P. Reese, Wilmington, N.C.; David W. White, Wilmington, N.C.

[73] Assignee: General Electric Company, Schenectady, N.Y.

[21] Appl. No.: 616,509

[22] Filed: Mar. 19, 1996

[51] Int. Cl.⁶ ........................................ G21C 3/34
[52] U.S. Cl. .................... 376/442; 376/438; 376/448
[58] Field of Search ........................... 376/438, 439, 376/441, 442, 444, 446, 448, 462

[56] References Cited

U.S. PATENT DOCUMENTS

| | | | |
|---|---|---|---|
| 3,933,584 | 1/1976 | Litt | 376/439 |
| 4,089,742 | 5/1978 | Amaral et al. | 376/444 X |
| 4,239,597 | 12/1980 | Christiansen | |
| 4,675,154 | 6/1987 | Nelson et al. | 376/444 |
| 4,876,063 | 10/1989 | Johansson | 376/444 |
| 4,897,241 | 1/1990 | Anthony | 376/438 |
| 5,130,083 | 7/1992 | Johansson | 376/441 |
| 5,149,495 | 9/1992 | Elkins | |
| 5,174,949 | 12/1992 | Johansson | 376/439 |
| 5,243,635 | 9/1993 | Bryan | 376/442 |
| 5,345,487 | 9/1994 | Johansson | |
| 5,434,898 | 7/1995 | Barkhurst | 376/438 |
| 5,488,644 | 1/1996 | Johansson | 376/441 |
| 5,566,217 | 10/1996 | Croteau et al. | 376/442 |

FOREIGN PATENT DOCUMENTS

| | | |
|---|---|---|
| 0 458 086 A1 | 11/1991 | European Pat. Off. |
| 0489334 | 6/1992 | European Pat. Off. ........... 376/448 |
| 0 516 307 A1 | 12/1992 | European Pat. Off. |
| 0 681 299 A1 | 11/1995 | European Pat. Off. |
| 3202238 | 9/1982 | Germany ........... 376/442 |
| 63-235890 A | 9/1988 | Japan |
| 02173594 | 7/1990 | Japan |

Primary Examiner—Michael J. Carone
Assistant Examiner—Matthew J. Lattig
Attorney, Agent, or Firm—Nixon & Vanderhye P.C.

[57] ABSTRACT

In a nuclear reactor fuel bundle assembly having a plurality of fuel rods and a non-round water rod extending between upper and lower tie plates, and having at least one fuel rod spacer located along the non-round water rod, an improvement which includes cooperating components on the fuel rod spacer and on the water rod for permitting movement of the spacer along the water rod to a desired axial location and for thereafter preventing further axial movement of the spacer in at least one of two opposite axial directions, the cooperating components including at least one spring on one of the spacer and the water rod.

2 Claims, 6 Drawing Sheets

Fig. 7
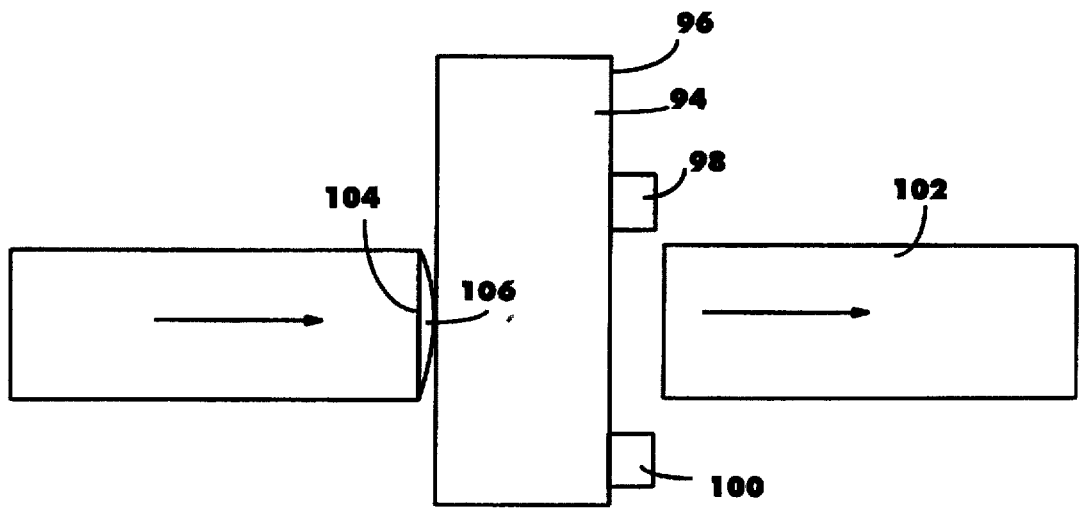
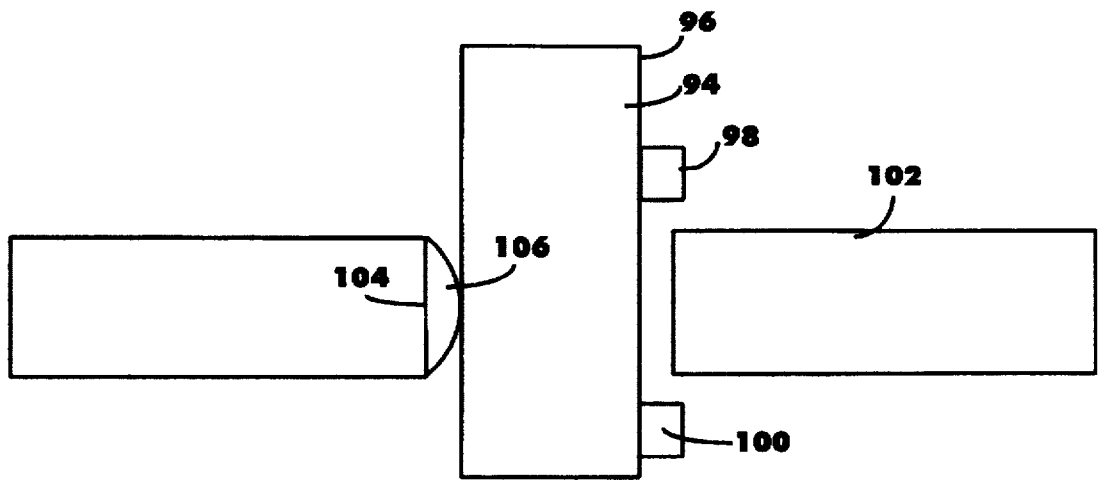
Fig. 7A

SPACER CAPTURE MECHANSIM FOR NON-ROUND WATER RODS

TECHNICAL FIELD

The present invention relates generally to nuclear reactor fuel bundle assemblies, and particularly, to the manner in which fuel rod spacers are axially fixed on non-round water rods within the assembly.

BACKGROUND

In boiling water nuclear reactors, fuel rods are grouped together in an open-ended tubular flow channel, typically referred to as a fuel assembly or bundle. A plurality of fuel assemblies are positioned in the reactor core in a matrix and a coolant/moderator flows upwardly about the fuel rods for generating steam. The fuel rods are supported between upper and lower tie plates in side-by-side parallel bundles. One or more water rods are usually centered within each fuel rod bundle. Spacers are employed at predetermined elevations along each fuel bundle to restrain the fuel rods from bowing or vibrating during reactor operation.

Typical spacers often include a plurality of ferrules arranged in side-by-side relation and secured, for example, by welding to one another to form a support matrix for the fuel rods. Generally, the role of the spacer in a fuel bundle assembly is to maintain the rods in fixed location relative to one another. These spacers must be secured or captured in some way so as to prevent their movement relative to the longitudinal axis of the bundle, during operation of the reactor.

The traditional method of maintaining fuel rod spacers in position along the axis of the bundle includes the use of small tabs welded to the water rods. Water rods have generally been of round cross section, and the assembly process is predicated on the ability to rotate the water rod after the spacers have been aligned, so that the tabs prevent axial spacer movement. Water rods with non-round cross sections, however, cannot be rotated relative to the spacer.

U.S. Pat. No. 5,149,495 describes one technique for locating spacers along non-round water rods. The technique there employs a recess on a portion of an exterior surface of a water rod, the recess being defined within a protrusion extending from the water rod either integrally or attached as by welding, brazing or other suitable means. The configuration of the water rod is such that the position of the recess with respect to the spacer can be changed by resilient deflection of the water rod itself. In other words, there is enough resilience in the water rod that a portion of the side wall near the recess can be inwardly deflected to effect movement of the recess portion during attachment of the spacer. Once the spacer is in place, the resiliency of the water rod permits spring back of the water rod side wall to substantially its original shape for engagement of the recess portion with a mating projection on the spacer. While this technique is acceptable in some circumstances, there are instances where the water rod wall thickness is too great to permit the necessary degree of deflection.

DISCLOSURE OF THE INVENTION

It is the principal objective of this invention to provide spacer capture mechanisms for square or other non-round water rods that has the characteristics and advantages of the mechanism typically used with round water rods. Specifically, the spacer capture mechanisms in accordance with this invention are designed to be simple, fast and reversible during the assembly process (spacers are rarely removed once the reactor becomes operational), while at the same time strong enough to secure the spacers against the forces encountered during assembly, transport, operation and maintenance. The design also permits disassembly of the bundle in a reactor fuel storage pool before or after irradiation.

Several alternative devices or methodologies for spacer capture with square or other non-round water rods are disclosed herein. In a first exemplary embodiment, slits are cut into a flat side wall of the square water rod so as to form three sides of a rectangular tab that acts as a spring. At the lower end of this spring cut-out, a projection is attached. During assembly of the spacer, the spring tab is depressed inwardly (manually or with an appropriate tool) allowing the spacer to pass over the projection. Once the spacer is in place, the spring tab is released for spring back to its original position, with the projection preventing axial movement of the spacer in one direction (generally the upward direction when the fuel bundle is assembled within the reactor core).

In a second exemplary embodiment, a leaf spring is incorporated into a spacer band on a side nearest the water rod. At the end of the leaf spring, a tab or dimple is attached or formed. The tab or dimple is designed to engage a hole formed in the side of the water rod as the spacer is moved into its desired axial location, thus precluding further axial movement in both upward and downward directions.

In both of the above described embodiments, it is desirable to keep leakage of coolant through the water rod side wall to a minimum.

In a third exemplary embodiment, the hole in the water rod as described above is replaced by a fixture welded or otherwise securely attached to the side of the water rod, with a recess provided in the fixture for mating engagement with the tab or dimple formed at the end of the leaf spring provided on the spacer.

In a variation of this embodiment, a groove is machined into the side of the water rod as an alternative to the fixture/recess described above.

In a fifth embodiment of the invention, a pair of tabs are secured to one side of the water rod in the same manner as in conventional round water rods. A spring is provided on the spacer band opposite the tabs which allows the spacer to be laterally offset from center, so as to clear the tabs during assembly. When released, the spring centers the spacer so that the tabs block any further axial movement of the spacer relative to the water rod.

In a sixth and final embodiment, a pair of springs are attached to the surface of the water rod in axially spaced relationship. The springs perform the function of the conventional tabs when in the relaxed position. But the springs may be depressed temporarily during bundle assembly to allow the spacer to pass over the springs and into position.

Accordingly, in its broader aspects, the present invention relates to In a nuclear reactor fuel bundle assembly having a plurality of fuel rods and a non-round water rod extending between upper and lower tie plates, and having at least one fuel rod spacer located along the non-round water rod, the improvement comprising cooperating means on the fuel rod spacer and on the water rod for permitting movement of the spacer along the water rod to a desired axial location and for thereafter preventing further axial movement of the spacer in at least one of two opposite axial directions, the cooperating means including at least one spring on one of the spacer and the water rod.

In another aspect, the invention relates to a fuel bundle assembly for a nuclear reactor comprising a plurality of fuel rods and at least one water rod supported on a lower tie plate; a plurality of spacers located at predetermined locations along the length of the water rod for holding the fuel rods in predetermined spaced relationship; and a spring element on one of the spacer and the water rod for preventing the spacer from moving along the rod in at least one axial direction after the spacer is moved to the predetermined location.

Additional objects and advantages of the subject invention will become apparent from the detailed description which follows.

BRIEF DESCRIPTION OF THE DRAWINGS

FIG. 7 is a schematic side view of a spacer and water rod incorporating a spacer retention mechanism as shown in a first spacer assembly position in accordance with a fifth exemplary embodiment of the invention;

FIG. 7A is a view similar to FIG. 7 but illustrating the spacer in a fixed non-assembly position.

BEST MODE FOR CARRYING OUT THE INVENTION

Figure 1:
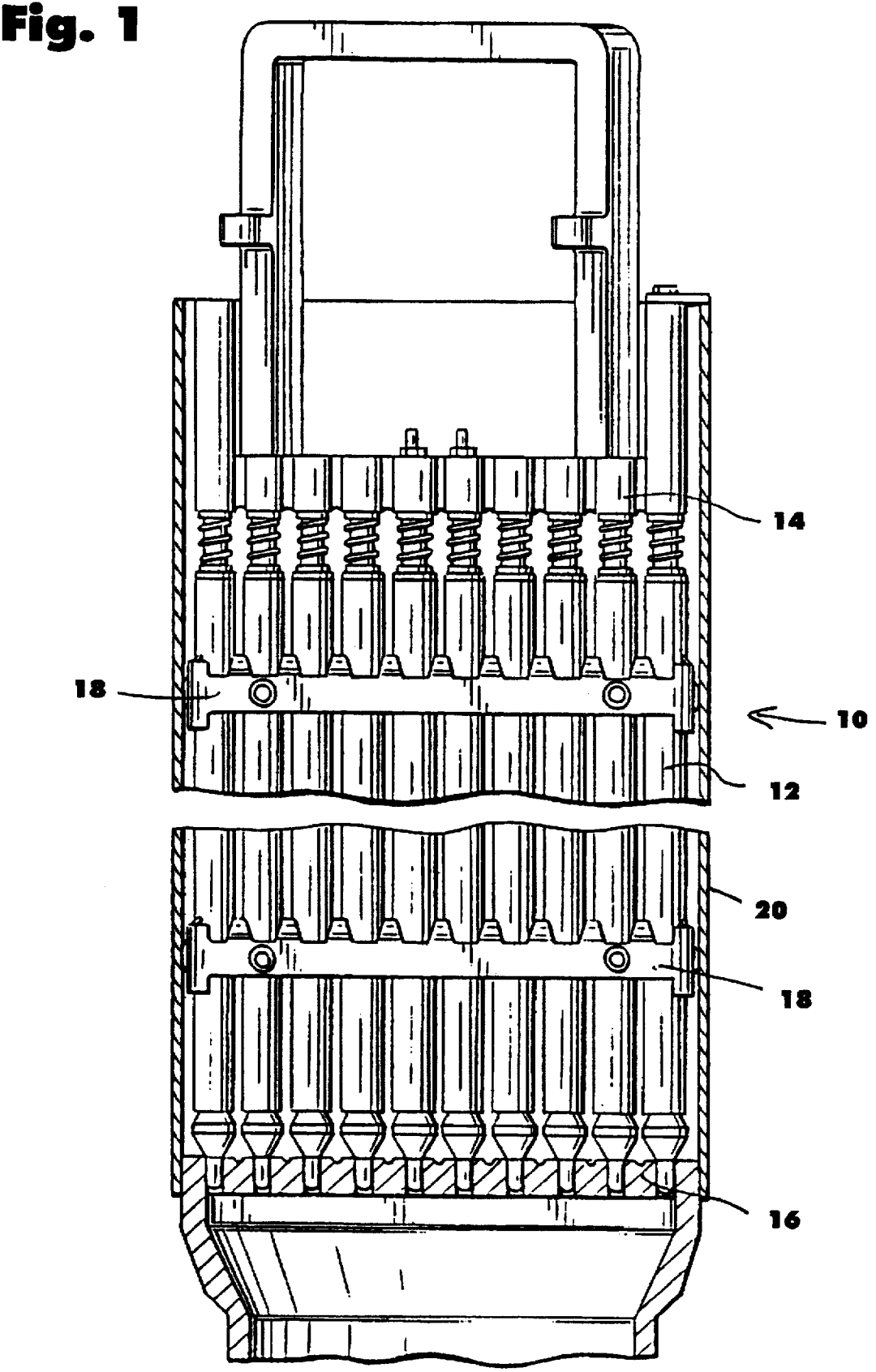
FIG. 1 is a partial section view of a conventional boiling water nuclear reactor fuel bundle assembly.

Referring now to FIG. 1, there is illustrated a nuclear fuel assembly, generally designated 10, including a plurality of fuel rods 12 supported between an upper tie plate 14 and a lower tie plate 16. The fuel rods 12 pass through a plurality of fuel rod spacers 18 at vertically spaced positions along the fuel bundle. Spacers 18 provide lateral support to retain the elongated fuel rods 12 in spaced relation relative to each other, and to restrain the fuel rods from lateral vibrations. Typically, the fuel rods are arranged in a 10×10 array, but the number of rods in the array may vary and the spacer retention mechanism of this invention are equally applicable to arrays containing any number of rods. Typically, one or more water rods (not shown in FIG. 1) are located within the fuel rod bundle and serve as a mounting location for the plurality of spacers 18.

Figure 2:
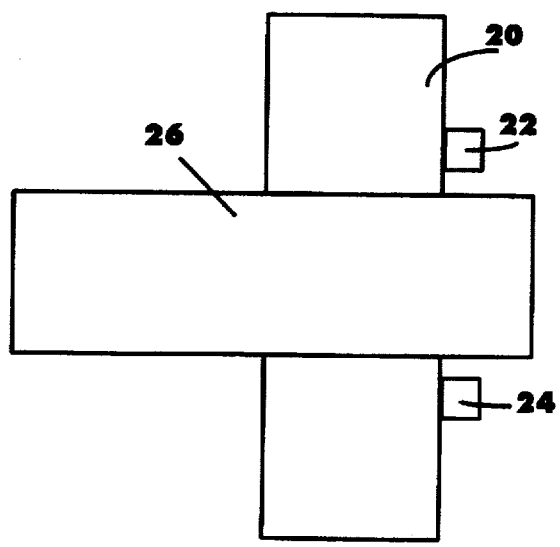
FIG. 2 is a partial side elevation of a spacer secured to a round water rod.
Figure 2B:
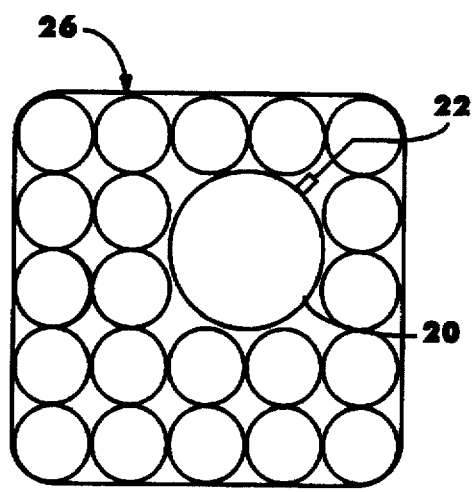
FIG. 2B is a plan view of FIG. 1 illustrating the water rod in a first assembly position.
Figure 2C:
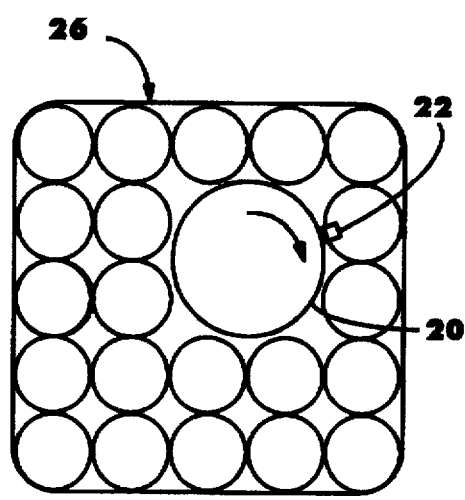
FIG. 2C is a plan view similar to FIG. 2B but with the water rod rotated to a spacer retention position.

Turning to FIG. 2, 2B and 2C, a conventional spacer-to-water rod retention mechanism for a round water rod is schematically illustrated. Specifically, the water rod 20 is provided with vertically (or axially) spaced tabs 22, 24, which are welded or otherwise secured to the rod 20. A spacer 26 is slidably engaged on the water rod and, in the assembly position, the water rod 26 is oriented as shown in FIG. 2B so that the tabs 22, 24 do not interfere with the sliding motion of the spacer 26. FIG. 2C illustrates the manner in which, once the spacer 26 is properly oriented along the length of the water rod, the water rod 20 may be rotated so that the tabs 22 and 24 are located to restrain any further axial movement of the spacer relative to the rod.

Figure 3A:
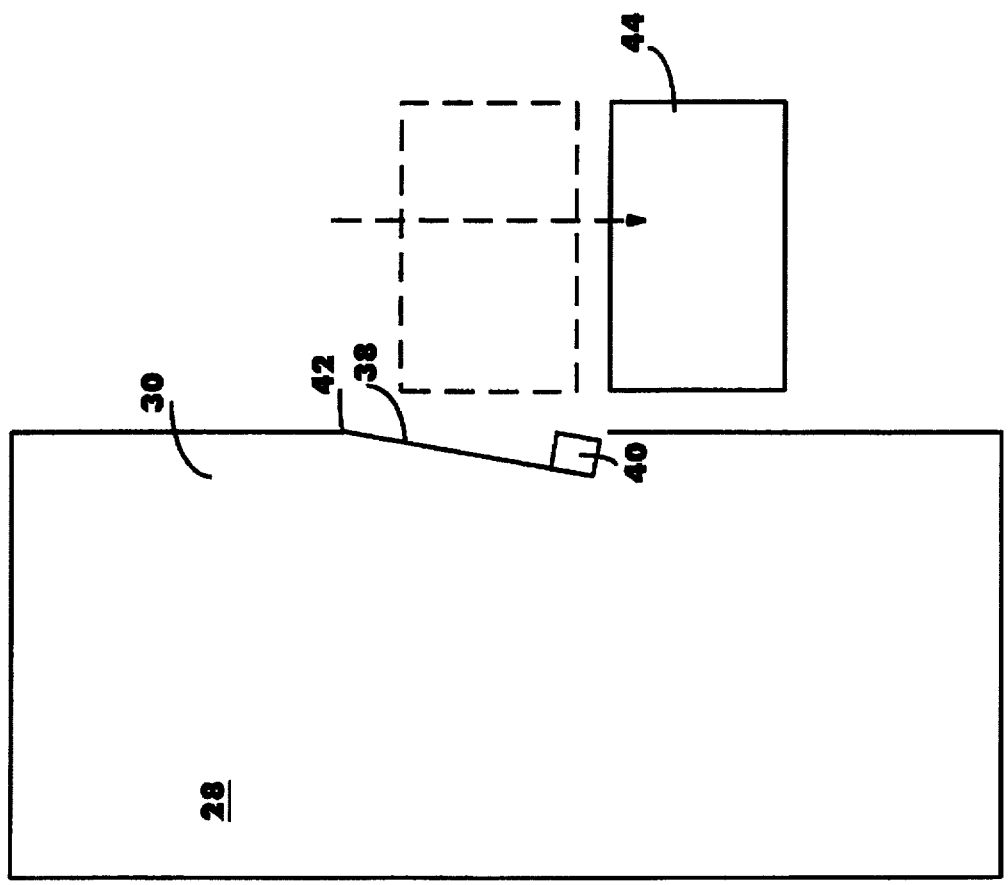
FIG. 3A is a schematic side view similar to FIG. 3, but rotated 90° and illustrating the assembly of an associated spacer.
Figure 3:
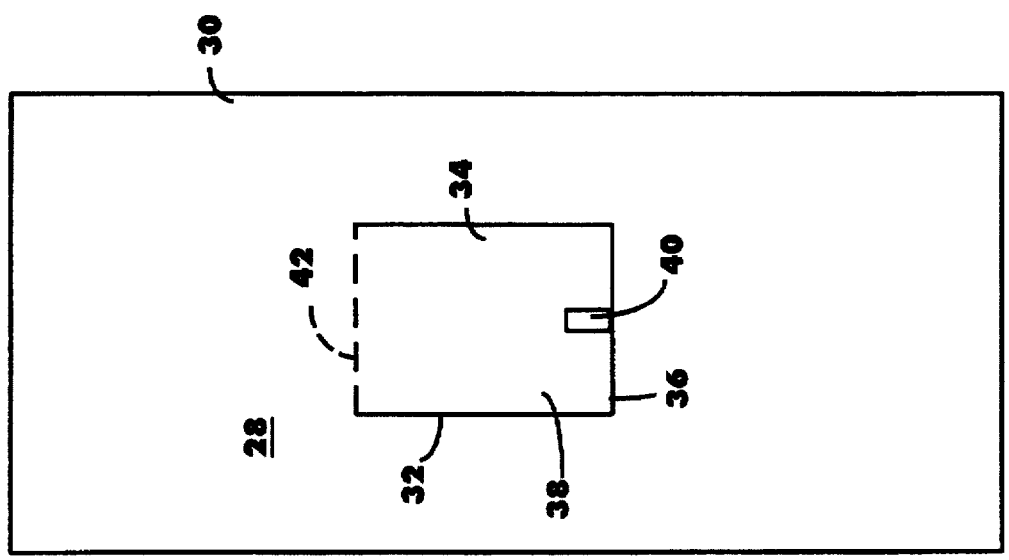
FIG. 3 is a schematic view of a water rod incorporating a tab spring in accordance with a first embodiment of the invention.

Turning now to FIGS. 3 and 3A, a spacer retention mechanism in accordance with a first exemplary embodiment of this invention is illustrated in connection with a square or otherwise non-round water rod 28. In this embodiment, a side wall 30 of the water rod is slit to form a three-sided tab defined by edges 32, 34 and 36. This arrangement forms a substantially rectangular spring tab 38 which is provided at its lowermost end with a dimple or projection 40. The tab or projection 40 may be applied to the spring tab 38 by welding or other appropriate means. It will be appreciated that the spring tab 38 is free to flex about a hinge line indicated by the dotted line 42 in FIG. 3. As seen in FIG. 3A, as a spacer 44 is slidably moved along the water rod 30 to its desired axial orientation, the spring tab 38 may be deflected inwardly manually or with an appropriate tool, so as to allow the spacer 44 to pass thereover. Once the spacer is properly oriented at a location axially adjacent the spring tab, the latter will be free to spring back to its original position, thus restraining opposite axial movement of the spacer in one direction (upward relative to the bundle in its normal vertical orientation) relative to the water rod. It will be appreciated by those skilled in the art that it is upward movement of the spacer during reactor operation which is of primary concern. If, on the other hand, it is desired to prevent axial movement in either direction, a similar tab can be provided below the spacer.

Figure 4:
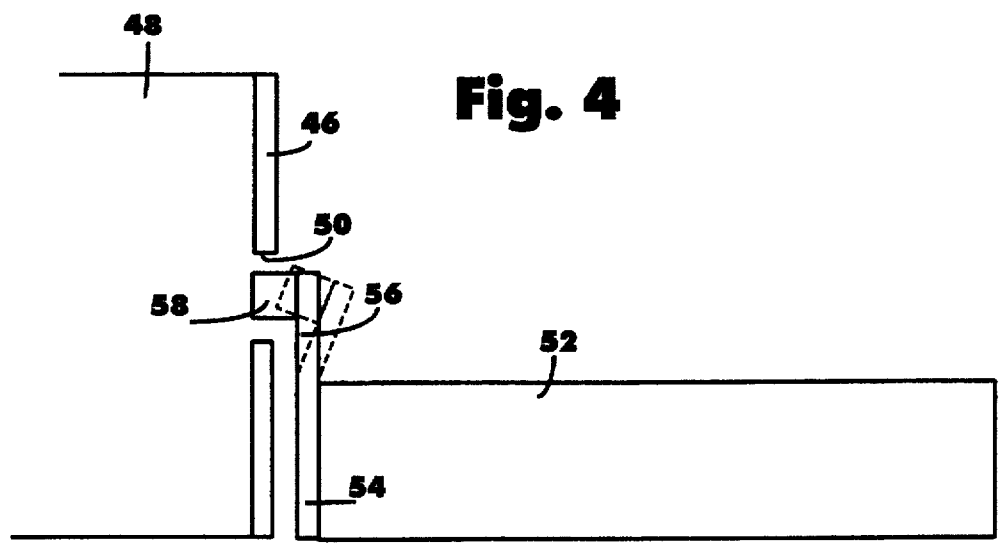
FIG. 4 is a schematic side view of a water rod and spacer in accordance with a second exemplary embodiment of the invention.

Turning now to FIG. 4, one side 46 of a square or non-round water rod 48 is formed with a hole 50. An associated spacer 52 includes the usual peripheral band 54 which, in this case, is formed with an axially projecting leaf spring portion 56. At the remote end of the spring 56, there is formed or provided a tab or dimple 58 which is sized to fit within the hole 50 formed in the water rod 48.

During assembly, the leaf spring 56 will be deflected as shown in phantom in FIG. 4 but as the spacer 52 reaches its desired axial orientation, the spring 56 will spring back to the position shown in solid lines in FIG. 4, with the tab or dimple 58 located within the hole 50. Further axial movement of the spacer 52 relative to the water rod 48 in both axial directions is prevented.

Figure 5:
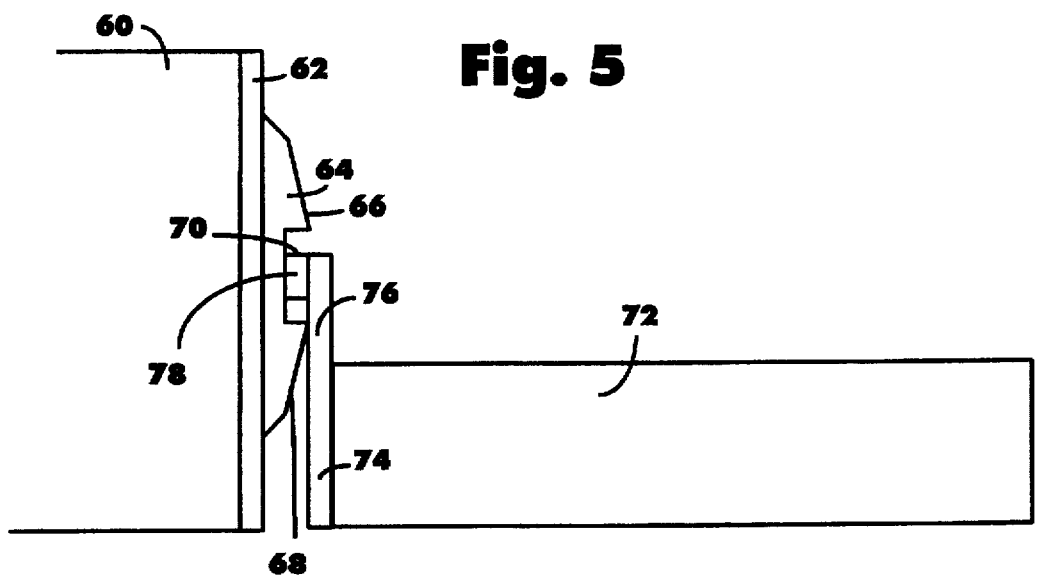
FIG. 5 is a schematic side view of a water rod and spacer incorporating a spacer retention device in accordance with a third embodiment of the invention.

With reference now to FIG. 5, a similar spacer retention mechanism is illustrated, but wherein the water rod 60 is provided on a flat wall 62 thereof with a fixture 64 including ramp surfaces 66 and 68 on either side of a centrally formed recess 70. The spacer 72 is similar to the spacer 52 described hereinabove in that the peripheral band 74 of the spacer is extended to form a leaf spring 76 having a tab or dimple 78 at the remote or free end thereof. With this arrangement, the leaf spring 76 will deflect inwardly as the tab or dimple 78 rides along the surfaces 66 or 68 depending on direction (or spring 76 can be deflected manually or via tool), and until the leaf spring is free to spring back to the position shown in FIG. 5, with the tab or dimple 78 seated within the recess 70 of the fixture 64.

Figure 6:
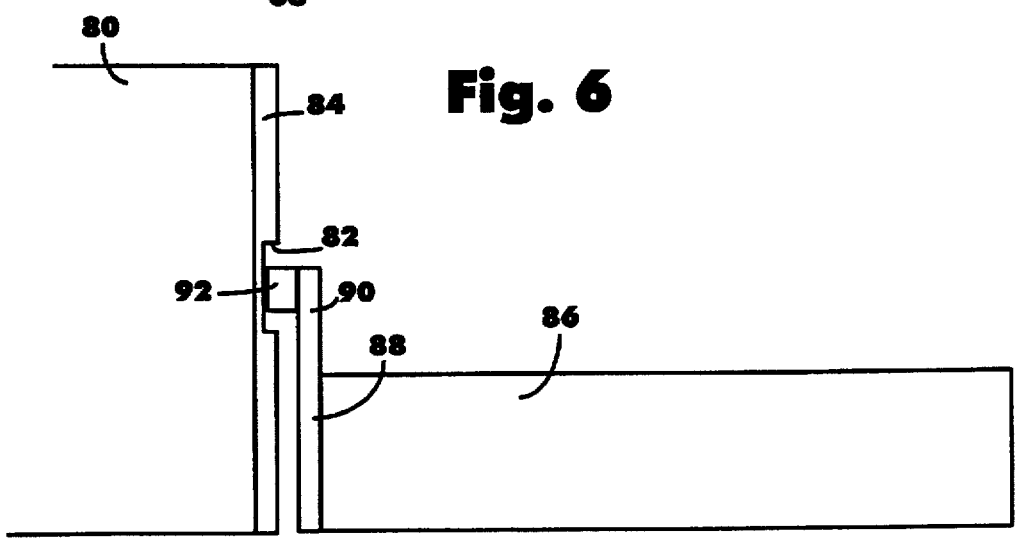
FIG. 6 is a schematic side view of a water rod and spacer incorporating a spacer retention mechanism in accordance with a fourth embodiment of the invention.

With reference now to FIG. 6, another similar spacer retention mechanism is provided but in this case, both the hole 50 (FIG. 4) and the fixture 64 (FIG. 5) have been eliminated. Specifically, water rod 80 is provided with a groove 82 machined into the flat side surface 84 of the rod. The spacer 86 is substantially identical to spacer 72 and 52 described hereinabove, in that the peripheral band 88 is extended to form a leaf spring 90 provided at its free end with a tab or dimple 92. The manner of assembly here is substantially identical to that described above with respect to FIG. 4, with the exception that the tab or dimple 92 merely seats within the groove or recess 82. The advantage of the embodiments in FIGS. 5 and 6 is that there is no penetration of the water rod and hence no leakage of water into or out of the water rod as in the case of the embodiments illustrated in FIGS. 3 and 4.

Turning now to FIG. 7, a square or otherwise non-round water rod 94 is provided on one flat side 96 thereof with a pair of tabs 98, 100 similar to those used with conventional round water rods. The tabs 98 and 100 are spaced axially along the water rod 96 so that a spacer 102 can be axially located therebetween. In this case, however, an interior vertical wall 104 of the spacer 102 is provided with a compression spring 106 which allows the spacer 102 to be moved laterally relative to the water rod, against the spring bias, to the position shown in FIG. 7. In this position, the spacer 102 is free to move axially along the length of the rod 96 without interference until it is positioned between the tabs 98 and 100. Once the spacer 102 is properly oriented, the spacer is released to spring back to its centered operating position as shown in FIG. 7A with the tabs 98 and 100 effectively preventing axial movement the spacer 102 relative to the water rod 94.

Figure 8:
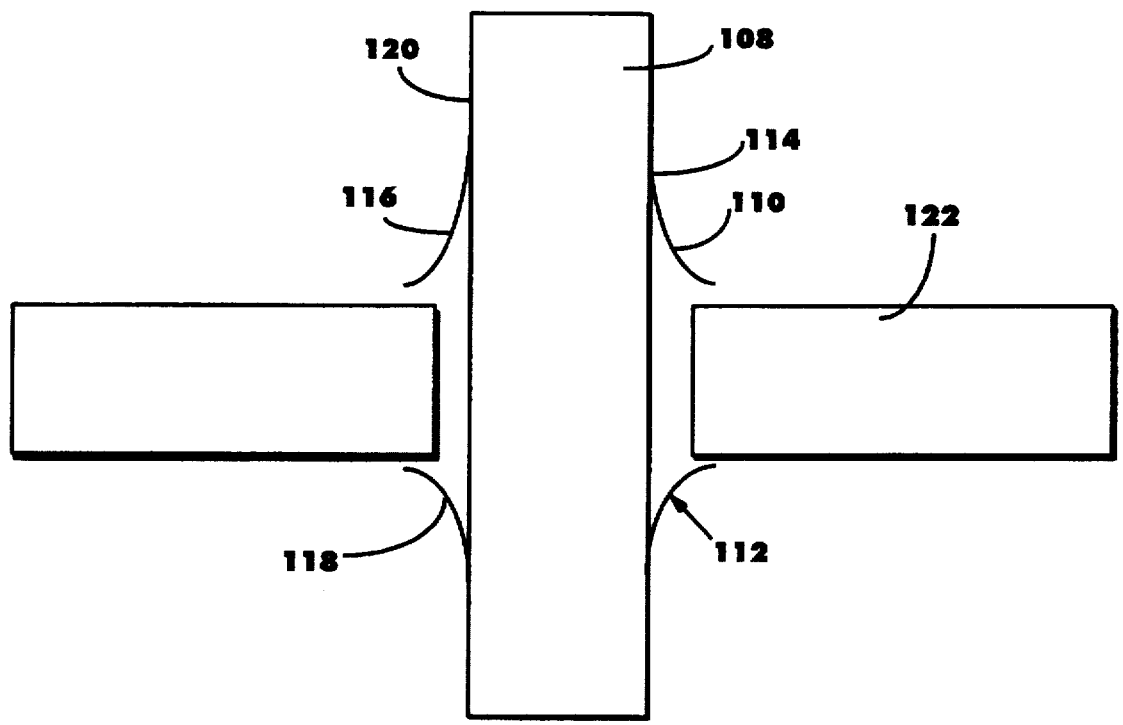
FIG. 8 is a side schematic of a water rod and spacer incorporating a spacer retention mechanism in accordance with a sixth and final embodiment of the invention.

Turning now to FIG. 8, a water rod 108 is provided with a pair of leaf springs 110, 112 on one flat side 114 of the water rod, while a similar pair of leaf springs 116, 118 are provided on an opposite flat side 120. Springs 110 and 116 are laterally aligned and vertically spaced from laterally aligned springs 112, 118, leaving a space therebetween for a spacer 122. It will be appreciated that the springs as shown allow the spacer to depress a pair of the springs (for example, springs 116, 110 when the spacer moves in a vertically downward direction as shown) and when the spacer is in the position shown in FIG. 8, the springs 110 and 116 will spring outwardly to the position shown in FIG. 8. In this operating position, the springs 110 and 116 above the spacer, and springs 112, 118 below the spacer, prevent further axial movement of the spacer 122 relative to the water rod 108.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear reactor fuel bundle assembly having a plurality of fuel rods and a non-round water rod extending between upper and lower tie plates, and having at least one fuel rod spacer located along the non-round water rod, said at least one spacer having a peripheral wall and one or more interior walls, the improvement comprising cooperating means on said fuel rod spacer and on said water rod for permitting axial movement of said spacer along said water rod to a desired axial location and for thereafter preventing further axial movement of said spacer in at least one of two opposite axial directions, said cooperating means including at least one spring on one of the walls of said spacer and at least one tab on said water rod, said at least one tab arranged to engage and thereby limit axial movement of the spacer along the water rod, said at least one tab located on a side of the water rod opposite that side which is engageable by said spring, thereby permitting said spacer to be biased in a lateral direction away from said at least one tab and perpendicular to a longitudinal axis of said water rod so that, during assembly, said spacer can be moved axially along the water rod past the at least one tab.

2. The improvement of claim 1 wherein said at least one tab comprises a pair of tabs arranged to capture the spacer therebetween so as to prevent further axial movement of said spacer in two opposite axial directions.

* * * * *